United States Patent
Ratts et al.

(10) Patent No.: US 12,071,876 B1
(45) Date of Patent: Aug. 27, 2024

(54) ESTIMATING DETERIORATION TRENDS OF AN EXHAUST CATALYST

(71) Applicant: Caterpillar Inc., Peoria, IL (US)

(72) Inventors: Joshua L. Ratts, Pine Village, IN (US); Hrishi Lalit Shah, Dunlap, IL (US); Deepashri Phatak, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/225,281

(22) Filed: Jul. 24, 2023

(51) Int. Cl.
*F01N 11/00* (2006.01)
*B01D 53/94* (2006.01)
*F01N 3/20* (2006.01)
*F01N 13/00* (2010.01)

(52) U.S. Cl.
CPC .......... *F01N 11/00* (2013.01); *B01D 53/9418* (2013.01); *B01D 53/9431* (2013.01); *B01D 53/9495* (2013.01); *F01N 3/208* (2013.01); *F01N 13/008* (2013.01); *B01D 2251/2067* (2013.01); *B01D 2257/404* (2013.01); *B01D 2258/012* (2013.01); *F01N 2550/02* (2013.01); *F01N 2900/0601* (2013.01); *F01N 2900/1402* (2013.01)

(58) Field of Classification Search
CPC ........ F01N 11/00; F01N 3/208; F01N 13/008; F01N 2550/02; F01N 2900/0601; F01N 2900/1402; B01D 53/9418; B01D 53/9431; B01D 53/9495; B01D 2251/2067; B01D 2257/404; B01D 2258/012
See application file for complete search history.

(56) References Cited

U.S. PATENT DOCUMENTS

| | | | | |
|---|---|---|---|---|
| 7,200,990 B2* | 4/2007 | Gabrielsson | ............ | F01N 3/206 60/303 |
| 8,538,721 B2* | 9/2013 | Sacco | .................. | F01N 11/002 702/130 |
| 8,573,043 B2* | 11/2013 | Bastoreala | .............. | F01N 11/00 73/114.75 |

(Continued)

FOREIGN PATENT DOCUMENTS

| | | |
|---|---|---|
| CN | 103605877 | 12/2016 |
| CN | 107103176 | 10/2020 |

(Continued)

*Primary Examiner* — Jesse S Bogue
(74) *Attorney, Agent, or Firm* — Schwegman Lundberg & Woessner, P.A.

(57) ABSTRACT

An aftertreatment system for an engine on a work machine may include a selective catalytic reduction (SCR) system configured for arrangement downstream of the engine and having a dosing system for dosing the SCR system with treatment fluid. The aftertreatment system may also include a $NO_{xin}$ sensor arranged at or near the inlet of the SCR system, a $NO_{xout}$ sensor arranged at or near the outlet of the SCR system, and an SCR catalyst monitoring module configured to periodically establish a maximum $NO_x$ conversion capacity of an SCR catalyst in the SCR system. A method for determining a maximum conversion capacity at a selected number or working hours and/or determining a remaining useful life of the SCR catalyst is also provided.

20 Claims, 6 Drawing Sheets

(56) References Cited

U.S. PATENT DOCUMENTS

| | | | | |
|---|---|---|---|---|
| 8,893,475 | B2* | 11/2014 | Geveci | F01N 3/208 |
| | | | | 60/274 |
| 8,978,362 | B2* | 3/2015 | Christner | F01N 9/00 |
| | | | | 60/287 |
| 8,991,154 | B2* | 3/2015 | Tai | F01N 3/208 |
| | | | | 60/299 |
| 9,784,166 | B2* | 10/2017 | Osburn | F01N 3/2066 |
| 9,890,678 | B2* | 2/2018 | Qi | F01N 3/208 |
| 10,167,762 | B2* | 1/2019 | Wang | B01D 53/9495 |
| 10,480,384 | B2 | 11/2019 | Khaled et al. | |
| 11,499,463 | B2 | 11/2022 | Swart et al. | |
| 2014/0144220 | A1* | 5/2014 | Ardanese | F01N 3/103 |
| | | | | 73/114.75 |
| 2015/0033705 | A1* | 2/2015 | Anilovich | F01N 3/208 |
| | | | | 60/274 |
| 2020/0263618 | A1* | 8/2020 | Muto | F02P 5/14 |
| 2020/0347770 | A1 | 11/2020 | Mendoza-pinon et al. | |
| 2023/0003152 | A1* | 1/2023 | Clerc | F01N 3/208 |

FOREIGN PATENT DOCUMENTS

| | | |
|---|---|---|
| CN | 111044668 | 12/2022 |
| WO | 2022125648 | 6/2022 |

\* cited by examiner

ESTIMATING DETERIORATION TRENDS OF AN EXHAUST CATALYST

TECHNICAL FIELD

The present application relates generally to exhaust treatment systems. More particularly, the present application relates to exhaust treatment or aftertreatment systems and methods relating to internal combustion engines. Still more particularly, the present application relates to estimating the remaining life of a catalyst in a selective catalytic reduction (SCR) system of an exhaust system.

BACKGROUND

Exhaust systems may include a particulate filter and a selective catalytic reduction (SCR) system. Generally, the particulate filter captures and stores exhaust soot and the SCR treats the exhaust to reduce oxides of nitrogen. The SCR relies on a catalyst and doses of treatment fluid to convert oxides of nitrogen to nitrogen and water. Over time, and depending on a multitude of factors, portions of the catalyst may get consumed and the effectiveness of the SCR system may be reduced.

Current methods of designing an SCR catalyst involve assumptions or design criteria including the type of work machine being operated by the engine, how hard the work machine will be run, what the environmental conditions surrounding the work machine will be, what type of fuel will be used, what level of $NO_x$ conversion is desired, and additional factors. These factors may contribute to one or more categories of things that affect the effectiveness of the catalyst such as biodiesel exposure, combusted oil exposure, and hydrothermal aging. Based on these design inputs, the SCR system may be designed for a particular number of operating hours after which the catalyst will need to be replaced. However, the work machine may not be operated in the exact conditions used during the design and, instead, the work machine may be used in a harsher conditions or less harsh conditions or a variety of conditions across a particular spectrum. Nonetheless, when the work machine has been operated for the number of operating hours defined by the design, the operator may be compelled to service the SCR to be sure to comply with relevant regulations.

US Patent Publication 2020/0347770 relates to systems and apparatuses that include a circuit structured to receive information indicative of a catalyst health, receive information from a sensor array indicative of a catalyst activity, determine a catalyst health management criteria has been met based on the information, determine a catalyst age based on the information indicative of the catalyst activity and the catalyst health management criteria being met, compare the determined catalyst age to a predetermined age threshold, and provide a notification when the determined catalyst age exceeds the predetermined age threshold. US Patent Application 10,480,384 relates to systems and methods for SCR feedgas diagnostics. An electronic system may comprise circuits for defining a diagnostic framework based at least on exothermic properties of various components of a DOC such that a DOC may be monitored for failure and/or end of useful life (EUL). International Publication WO2022125648 relates to a system for estimating an aging of the exhaust aftertreatment system.

SUMMARY

In one or more examples, an aftertreatment system for an engine on a work machine may include a selective catalytic reduction (SCR) system configured for arrangement downstream of the engine and having a dosing system for dosing the SCR system with treatment fluid. The system may also include a $NO_{xin}$ sensor arranged at or near the inlet of the SCR system and a $NO_{xout}$ sensor arranged at or near the outlet of the SCR system. The system may also include an SCR catalyst monitoring module configured to periodically establish a maximum $NO_x$ conversion capacity of an SCR catalyst in the SCR system.

In one or more other examples, a method of aftertreatment of exhaust from an engine may include periodically establishing a maximum conversion capacity of an SCR catalyst within a selective catalytic reduction (SCR) system on an operating work machine. The method may also include determining a maximum conversion capacity at a selected number or working hours based on at least 2 of the periodically established maximum conversion capacities. Alternatively or additionally, the method may include determining a remaining useful life of the SCR catalyst based on the at least 2 of the periodically established maximum conversion capacities.

DETAILED DESCRIPTION

Figure 1:
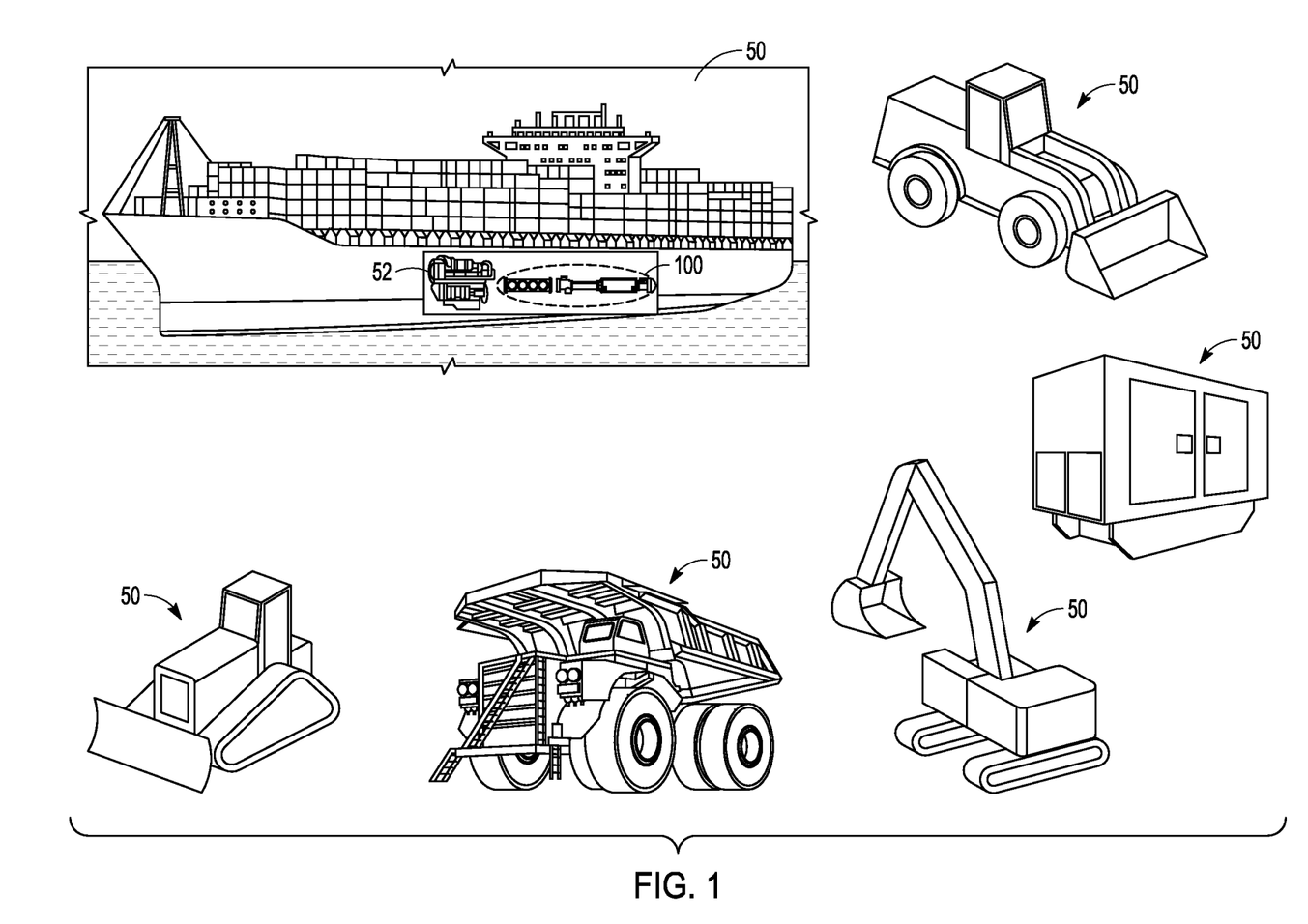
FIG. 1 includes perspective views of a variety of work machines each being powered by a combustion engine and having an aftertreatment system, according to one or more examples.

FIG. 1 includes perspective views of a wide variety of work machines 50 each being powered by a combustion engine and having an aftertreatment system 100 for the exhaust of the combustion engine. For example, as shown for the waterborne vessel 50, the waterborne vessel 50 may be powered by one or more diesel engines 52, which may be adapted to provide propulsion and/or propulsion in combination with electrical generation. As shown, the diesel engine 52 may include an aftertreatment system 100 configured for treating the exhaust of the engine 52 prior to releasing the exhaust into the atmosphere. Similarly, and while not particularly depicted, the other work machines 50 may include a diesel engine which may be adapted to provide motive power, via wheels, tracks, skid feet, etc., and may also power a hydraulic system for operating an implement such as a blade, bucket, dump body, or other articulating or operable tool on the work machine. In still other examples, the diesel engine may be adapted to power a generator to generate electrical power. Still other diesel-powered equipment may be equipped with an aftertreatment system and the useful life of a catalyst in the aftertreatment system may be estimated using a method according to the present disclosure. Moreover, while diesel engines have been mentioned and used as an example below, other internal combustion engines may benefit from the estimation system and method described herein.

Figure 2:
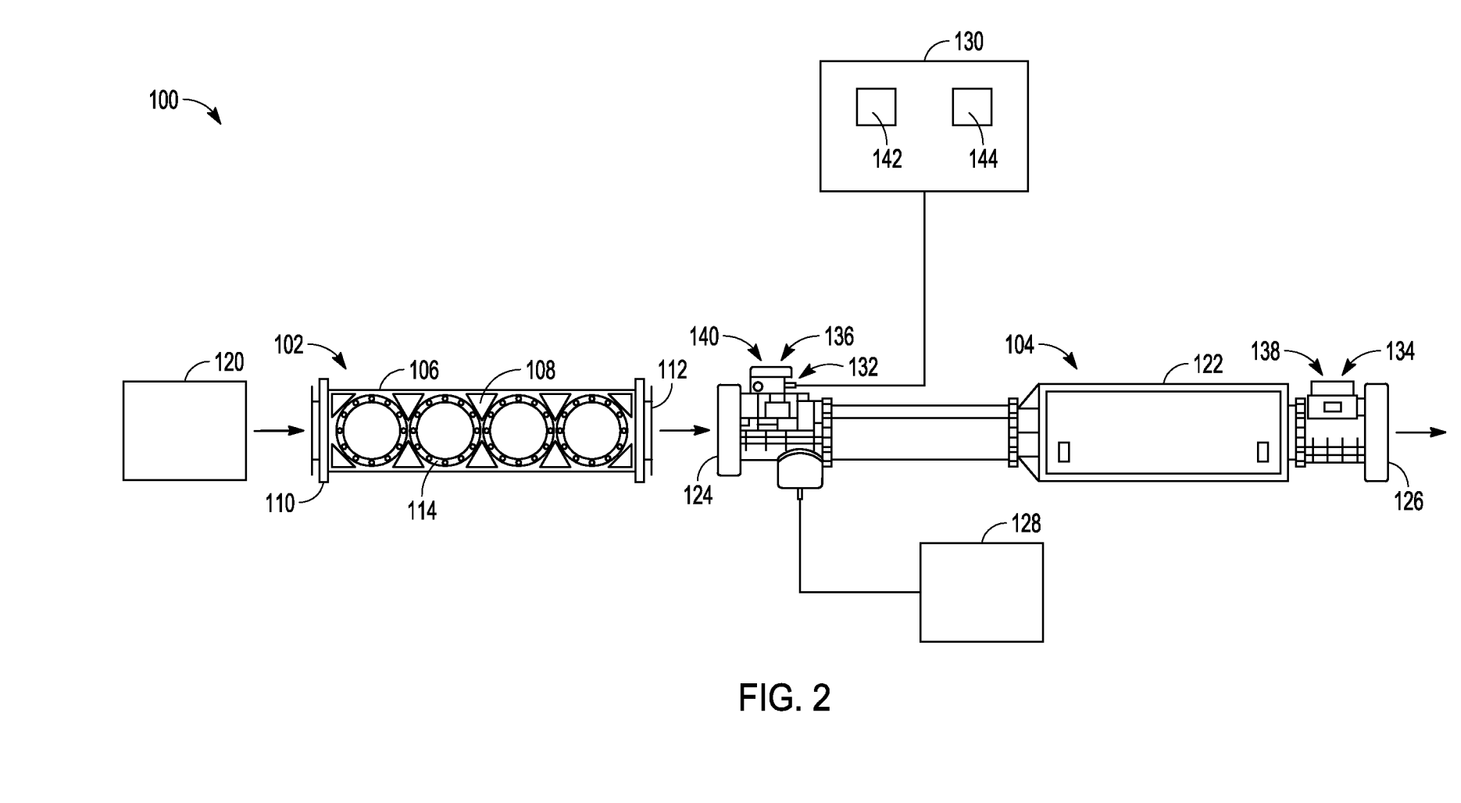
FIG. 2 is a schematic view of an example of an aftertreatment system of the work machine, according to one or more examples.

Referring now to FIG. 2, a schematic view of an aftertreatment system 100 for a combustion engine such as those shown and described in FIG. 1 is shown. The aftertreatment system 100 may be configured to reduce emissions from the combustion engine. In particular, the aftertreatment system 100 may be configured to control particle emissions and nitrogen gas emissions from a diesel engine 52. As shown, the system 100 may include a diesel particulate filter (DPF) 102 and a selective catalytic reduction (SCR) system 104. Moreover, the SCR 104 may be designed for operation apart from or in conjunction with the DPF 102.

Where present, the diesel particulate filter (DPF) 102 may be configured to filter out diesel particulate in an exhaust stream from the diesel engine 52. For example, the DPF 102 may be configured to filter out soot and ash from the exhaust stream. Moreover, the DPF 102 may be configured for ongoing (e.g., passive) regeneration. In one or more examples, the DPF 102 may include a housing 106 forming a cavity 108 and having an inlet 110 and outlet 112. The DPF 102 may also include a filtration system 114 within the housing (e.g., arranged in the cavity). The filtration system 114 may define one or more fluid pathways through the DPF 102 from the inlet 110 to the outlet 112. The filtration system 114 may include a filter media arranged across the one or more fluid pathways such that the exhaust gas from the diesel engine 52 passes through the filter media before exiting the DPF 102. In one or more examples, the filter system 114 may include a honeycomb structure having a portion of the honeycomb pathways plugged on an inlet side and a remaining portion of the honeycomb pathways plugged on an outlet side. This formation may cause exhaust gas from the engine 52 to enter the non-plugged honeycomb cavities on the inlet side, pass through the filter media into a neighboring cavity and exit the non-plugged honeycomb cavities on the outlet side. Still other approaches to defining a pathway and placing a filter media across the pathway may be provided including filter media folded in switchback fashion or other approaches to exposing the exhaust air to a relatively large surface area of filter media. In any case, the filter media may have a porosity selected to allow exhaust gas through the filter media while preventing passage of ash and soot.

As mentioned, the DPF 102 may also be configured for ongoing (e.g., passive) regeneration. For example, in one or more examples a diesel oxidation catalyst (DOC) 120 may be provided upstream of the DPF. The DOC 120 may function to produce nitrogen dioxide ($NO_2$). For example, the DOC 120 may include an oxidation catalyst that functions to absorb oxygen from the exhaust gas providing an opportunity for other elements in the exhaust gas to react with the bonded oxygen. In particular, nitric oxide (NO) may react with the oxygen to form nitrogen dioxide ($NO_2$). When the nitrogen dioxide passes through the filtration media in the DPF 102, the nitrogen dioxide may react with the carbon in the soot to form carbon dioxide ($CO_2$), which may then pass through the filtration media. Alternatively or additionally, the DPF 102 may include a catalyst in the filter media, which may function to generate $NO_2$. The $NO_2$ generated in the filter media may back diffuse through the filter media and react with the soot to form $CO_2$, which may pass through the filter media and out of the DPF 102. In either case, some of the $NO_2$ generated either in the DOC 120 or within the filter media of the DPF 102 may not be fully absorbed or utilized in the regeneration process and, as such, the nitrogen oxide gases ($NO_x$) leaving the DPF 102 may be a combination of NO and $NO_2$. It to be appreciated that while the DOC 120 has been shown outside of the DPF, it may also be incorporated therein.

The selective catalytic reduction (SCR) system 104 may be arranged downstream of the DPF 102. The SCR 104 may be configured to reduce the amount of nitrogen oxide gas ($NO_x$) in the exhaust gas before it is released into the atmosphere at the tail pipe. In particular, the SCR 104 may function to react ammonia ($NH_3$) with $NO_x$ in the exhaust gas to produce nitrogen and water and, as such, reduce the emission of $NO_x$. The SCR 104 may include a housing 122 defining an internal cavity and having an inlet 124 and an outlet 126. The SCR 104 may have a diesel exhaust fluid (DEF) reservoir 128 in fluid communication with the cavity via a controllable valve or nozzle. In one or more examples, the DEF may be in fluid communication with the exhaust stream upstream of the SCR 104 and not directly in the cavity. The SCR 104 may also have a series of catalysts arranged within the cavity. For example, the SCR 104 may include a hydrolysis catalyst adapted to convert liquid urea to ammonia, for example. The SCR may also include an SCR catalyst to convert the ammonia and $NO_x$ to nitrogen and water. The SCR catalysts may include various porous ceramic materials with active catalytic components arranged on the ceramic material. For example, the SCR catalyst may include oxides of base metals such as vanadium, molybdenum, iron, copper, and tungsten, zeolites, or various precious metals may be used. Still other active catalytic components may be used. In one or more examples, the SCR 104 may also include an oxidation catalyst or an ammonia slip catalyst to address any remaining ammonia in the exhaust gas. It is to be appreciated that SCR systems without a hydrolysis catalyst and/or without an ammonia slip catalyst may also be provided depending on the nature of the system.

The SCR 104 may also include a controller 130 that controls the dosing of the DEF to suitably treat the amount of $NO_x$ in the exhaust gas. For this purpose, the SCR 104 may also include an inlet $NO_x$ sensor 132 and an outlet $NO_x$ sensor 134. Software may be present in the controller 130, which may calculate the amount of DEF dosing that is suitable to treat the amount of $NO_x$ in the exhaust stream. Based on these calculations, the software may function to control a dosing pump, valve, and/or nozzle, which may control a flow rate of DEF into the exhaust stream. This flow control may be an ongoing stream of DEF at a particular rate, a periodic dosing or spraying of the DEF into the SCR 104, or other method of controlling the volume and timing of the dosing of the DEF. In addition to the $NO_x$ sensors 132/134 mentioned, the SCR may also include a temperature sensor 136 arranged at or near the inlet. The temperature sensor 136 may, alternatively or additionally, be arranged on the outlet 112 of the DPF 102 or between the DPF 102 and the SCR 104. Still other locations for the temperature sensor 136 may be provided and additional temperature sensors such as temperature sensor 138 may be provided. Likewise, while the $NO_x$ sensors have been said to be located at the inlet and outlet of the SCR, still other or additional locations and/or additional sensors may be provided. Moreover, a pressure sensor 140 may be provided at or near the inlet 124 of the SCR 104 and/or at other locations on the SCR 104.

As mentioned above, the present SCR 104 may be configured for operation apart from a DPF 102 and/or together with a DPF 102. In the case where the SCR 104 is operated apart from a DPF 102, the inlet gases may come generally directly from the engine exhaust and the nitrogen gases ($NO_x$) in the exhaust gas may be primarily NO. However, in the case where the SCR 104 is operated together with a DPF 102 and, in particular, a DPF 102 having a diesel oxidation catalyst or internal catalyst that generates $NO_2$, the nitrogen gas in the outlet gas from the DPF 102 may include a combination of NO and $NO_2$. That is, as described above, the DPF 102 and/or DOC 120 may convert some of the NO from the engine exhaust to $NO_2$ to help treat soot. Unfortunately, the $NO_x$ sensor 132 on the inlet 124 of the SCR 104 may not accurately measure the amount of $NO_x$ in the gas stream where the $NO_x$ is a mixture of NO and $NO_2$. For this purpose, when the SCR 104 is used in conjunction with a DPF 102, the controller 130 may include an adjustment module 142 configured to adjust the $NO_x$ concentration measured by the inlet sensor 132 on the SCR 104 based on an estimate of the amount $NO_2$ that makes up the overall nitrogen gas portion of the exhaust stream entering the SCR 104 and an adjustment calculation may calculate the estimated actual total $NO_x$ such that SCR may be properly dosed with DEF to suitably treat the $NO_x$ in the exhaust to reduce the $NO_x$ emission. In one or more examples, the controller may rely on methods as described in U.S. patent application Ser. No. 17/665,796 entitled Aftertreatment System, and filed on Feb. 7, 2022, the content of which is hereby incorporated by reference herein, in its entirety.

The $NO_x$ sensor 134 at the outlet of the SCR may be configured for use as a check of the actual amount of $NO_x$ coming out of the SCR and may also be configured for use to determine the $NO_x$ conversion rate. The $NO_x$ sensor 134 (and the $NO_x$ sensor 132 for that matter) may be an electromechanical based sensor and may include a ceramic $NO_x$ sensor linked to a microprocessor, for example. It is to be appreciated that the $NO_x$ sensors 132/134 present on the work machine may be relatively conventional in situ sensors that are cross-sensitive to $NH_3$. That is, the $NO_x$ sensors on the work machine may not be able to differentiate between $NO_x$ and $NH_3$.

In addition, the controller 130 may include an SCR catalyst monitoring module 144. The SCR catalyst module 144 may be configured to control dosing of the SCR for purposes of assessing a current/live conversion capacity of the SCR catalyst within the SCR. That is, the module 144 may control dosing and may function to determine the conversion capacity of an SCR catalyst on a work machine when the work machine is operating, on a project, on a jobsite (e.g., without taking the work machine out of service or taking the machine in for maintenance or repair). In particular, and as described in more detail below with respect to the method for determining catalyst deterioration trends, the controller 130 and/or the module 144 may include computer-implemented instructions stored thereon for controlling particular aspects of the work machine to assess the current effectiveness or efficiency of the SCR catalyst per the method described herein. The computer-implemented instructions may be software, hardware, or a combination of software and hardware and may be an additional feature of the controller 130. The controller may be part and parcel to the electronic control module of the work machine or a separate dedicated SCR controller may be provided. Moreover, while the SCR catalyst monitoring module 144 has been said to be part of the controller 130 on the work machine, data from operation of the work machine may also be transmitted to back of house operations where processing of the data may be performed offboard of the machine. That is, for example, the machine may include a transmitter or transceiver that may transmit $NO_x$ sensor data, temperature data, or other data from the machine to back of house operations. The transmission may be over a wide area network or a local area network. In any case, the computer-implemented instructions onboard the machine or offboard the machine may be adapted to perform the method for determining catalyst deterioration trends as outlined with respect to FIG. 3 below.

INDUSTRIAL APPLICABILITY

As mentioned, the SCR catalyst, and/or the hydrolysis catalyst for that matter, may be designed based on particular assumptions relating to use and may be assigned an operational period of hours based on that design. However, continually monitoring operating conditions, environmental conditions, engine temperatures, etc. and comparing them to the design assumptions may be impractical. Moreover, tools and systems for measuring the resulting biodiesel exposure, combusted oil, and/or hydrothermal exposure may also be impractical for implementation on active working machines. That is, estimating a remaining useful life of the catalyst by comparing actual conditions to design conditions may be impractical.

In view of the above, the present application presents a method for actively determining deterioration trends of an SCR catalyst, but without the above-mentioned monitoring or measurements. That is, rather than monitor all of the things that may affect the deterioration rate of the catalyst, the method below directly measures or estimates the conversion capacity of the catalyst at particular points in time, which allows for determining a deterioration trend. Moreover, and in some examples, the system may measure the conversion capacity using existing sensors by taking advantage of the cross-sensitivity of $NO_x$ sensors, for example. to both $NO_x$ and $NH_3$. As such, the present method may be performed with few, if any, changes to existing equipment, while providing a very accurate estimation of the deterioration trend/rate of an SCR catalyst.

Figure 3:
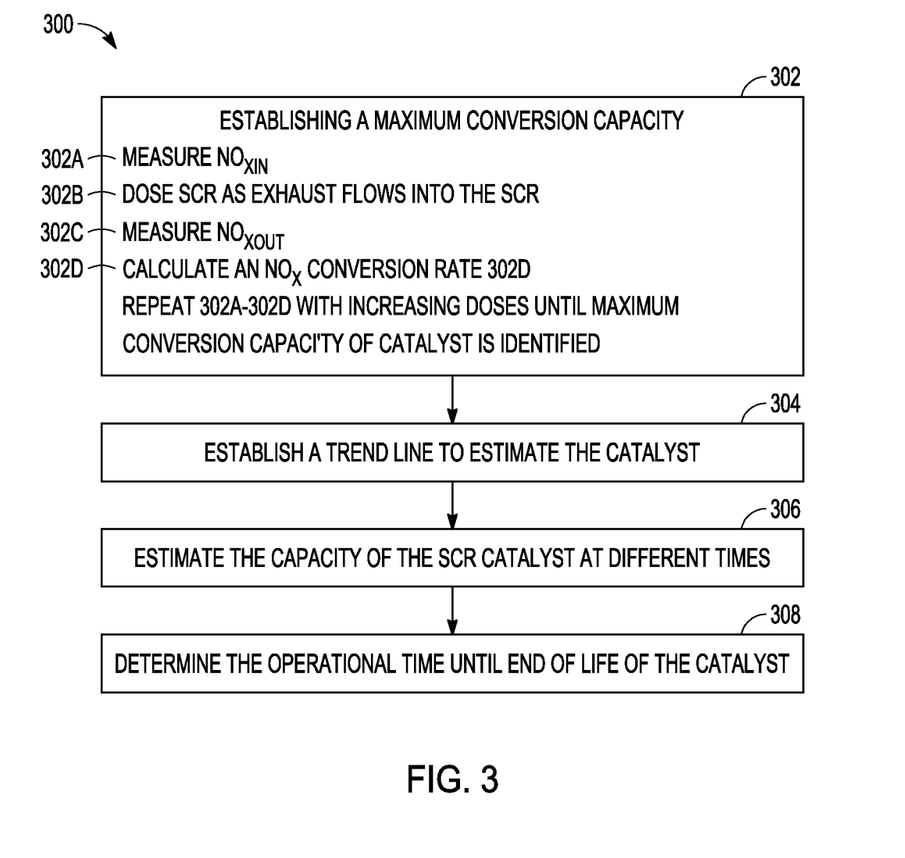
FIG. 3 is a diagram depicting a method of determining the remaining useful life of a catalyst in an SCR system such as that of FIG. 2.

The method for determining a deterioration trend of an SCR catalyst may include periodically establishing a maximum $NO_x$ conversion capacity of the SCR catalyst 302. The method may also include using two or more of these periodic maximum capacities and the time between them to establish a trend line to estimate the catalyst useful life 304. In one or more examples, three or more periodic maximum capacities may be used such that the trend line may be something more than a straight trend line and may be a curvilinear trend.

The process of establishing a maximum $NO_x$ conversion capacity 302 may include an iterative process involving varying the dosing to the SCR system. That is, generally, establishing a maximum $NO_x$ conversion capacity of the SCR catalyst 302 may include increasingly dosing the SCR until no further or very limited conversion of $NO_x$ is occurring despite the increasing dosing of DEF or other treatment fluid. The increasing dosing of the DEF or other treatment fluid may allow for isolating the catalyst as the limiting factor in the $NO_x$ conversion process allowing for the maximum conversion capacity of the catalyst to be identified.

More particularly, establishing a maximum conversion capacity of the SCR catalyst 302 may include measuring an input $NO_x$ concentration of an exhaust gas using a $NO_x$ sensor 132 arranged upstream of the SCR on the work machine 302A. Establishing a maximum conversion capacity 302 may also include dosing the SCR with DEF or other treatment fluid as the exhaust gas flows therethrough 302B and measuring an output $NO_x$ concentration using a $NO_x$ sensor 134 arranged downstream of the SCR on the work machine 302C. As may be appreciated, given the $NO_{xin}$ and the $NO_{xout}$, a $NO_x$ conversion may be calculated by subtracting the $NO_{xout}$ from the $NO_{xin}$ to determine an $NO_x$ reduction and dividing the $NO_x$ reduction by the $NO_{xin}$ to arrive at a percentage $NO_x$ conversion. (e.g., simplified equation may be $NO_x$ Conversion=$1-NO_{xout}/NO_{xin}$).

Figure 5:
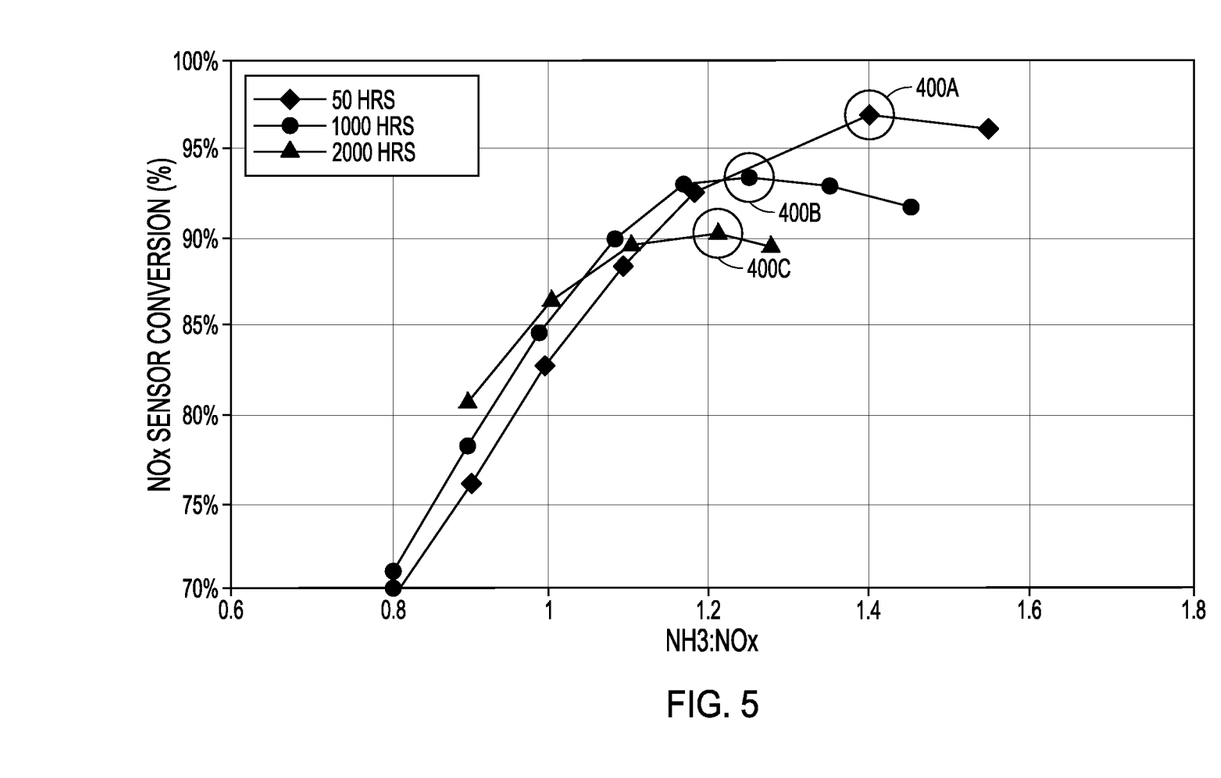
FIG. 5 is a graph showing the conversion capacity of an SCR, such as that of FIG. 2, based on an on-machine sensor and particular ratios of $NH_3$ to $NO_x$, according to one or more examples.

The process 302 above of measuring 302A, dosing 302B, measuring 302C, and calculating an $NO_x$ conversion 302D may be repeated several times with an increasing amount of DEF or other treatment fluid dosing. For example, the dosing rate may be based on the $NO_{xin}$ and may begin within a range of 0.6 $NH_3:NO_x$ to about 1.0 $NH_3:NO_x$ or a range of 0.7 $NH_3:NO_x$ to about 0.9 $NH_3:NO_x$ or a dosing rate of approximately 0.8 $NH_3:NO_x$ may be used. The dosing rate may be increased in increments such as by 0.05 $NH_3:NO_x$ to 0.15 $NH_3:NO_x$ or approximately 0.1 $NH_3:NO_x$. The dosing rate may be increased until a maximum conversion is identified as shown in FIG. 5. That is, at some point, while the $NO_x$ conversion may continue to increase, it may be offset by an increasing amount of ammonia slip (e.g., unused ammonia or $NH_3$), which may reveal the maximum useful conversion capacity of the catalyst. (e.g., as measured by a $NO_x$ sensor that is cross sensitive to $NH_3$). As shown, and in one or more examples, the DEF dosing may be increased in increments to a point where the dosing rate ranges from approximately 1.2 $NH_3:NO_x$ to 1.8 $NH_3:NO_x$ or from approximately 1.4 $NH_3:NO_x$ to 1.7 $NH_3:NO_x$ or to a dosing rate of approximately 1.6 $NH_3:NO_x$. Still other starting points for dosing, incremental increases, and upper ranges of dosing may be provided depending on the various characteristics of the SCR system being monitored, the age of the catalyst, and other factors.

Figure 4:
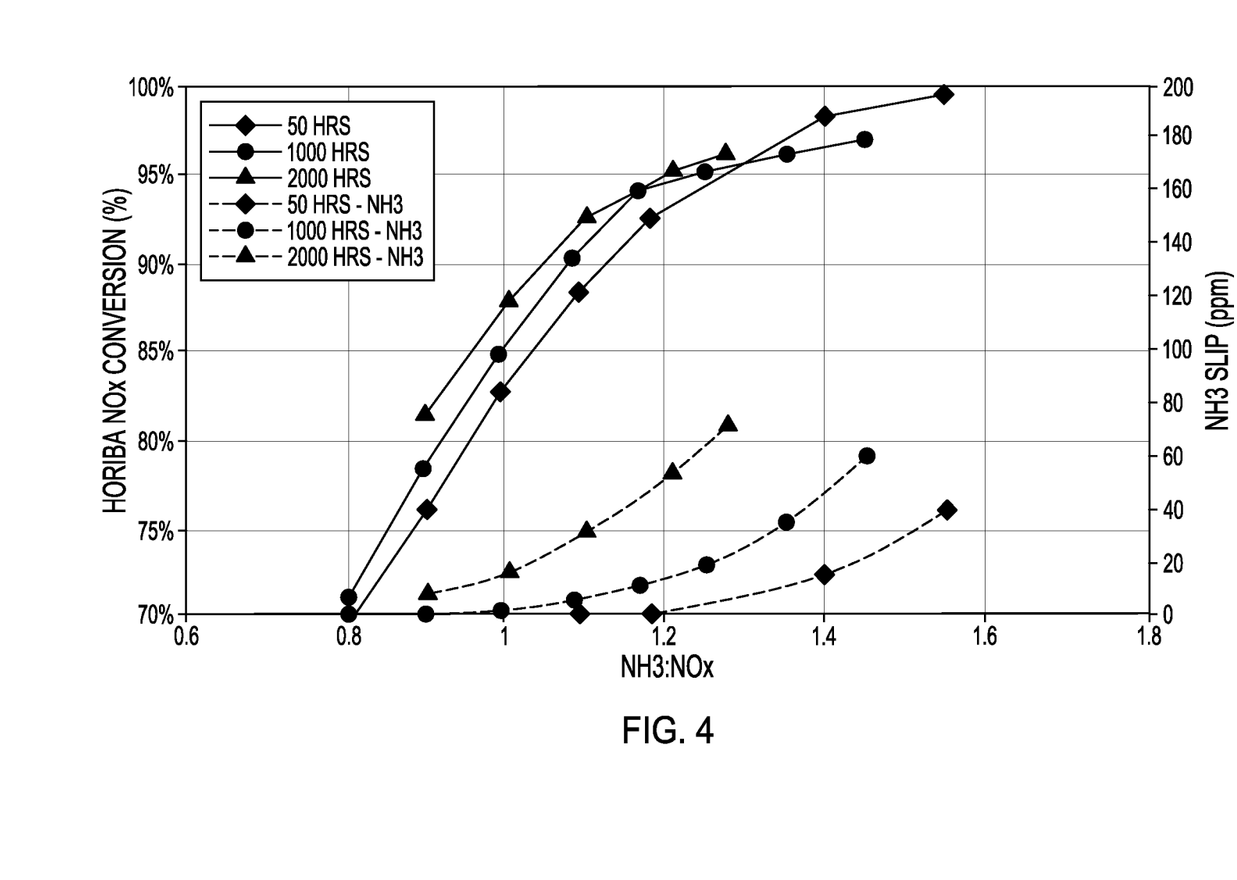
FIG. 4 is a graph showing the conversion capacity of an SCR based on a Horiba lab emissions system and particular ratios of $NH_3$ to $NO_x$.

With that general understanding of the overall method 300 and for a better understanding of what is shown in FIG. 5, reference is made to FIG. 4. FIG. 4 depicts a lab condition where a Horiba system or other relatively elaborate lab-based sensor system may be used to establish the conversion rate of the SCR catalyst. As shown, as the DEF dosage rate increases (e.g., the ratio of $NH_3$ to $NO_x$ along the X-axis), the percentage of conversion of $NO_x$ increases, but begins to taper to a shallower increase after the dosage rate gets relatively high. Moreover, at some level of $NO_x$ conversion, while the conversion rate continues to increase (albeit at a flatter rate), the amount of ammonia slipping through the SCR and not being consumed begins to increase as shown by the $NH_3$ lines near the bottom of the graph and measured along the right-side vertical axis of the graph.

Turning now to FIG. 5, and as a reminder from the discussion above, $NO_x$ sensors on work machines (e.g., not the in lab and not using impractical Horiba measurement systems) are cross-sensitive to both $NO_x$ and $NH_3$. This allows for identifying a maximum conversion capacity of the SCR based on a graph such as that shown in FIG. 5 (e.g., engines with aftertreatment systems that are installed and operating on equipment and are not isolated from the equipment in a lab, for example). That is, while the $NO_x$ sensor on the equipment is intended to measure $NO_x$ exiting the SCR, its cross-sensitivity may cause it to measure the combined $NO_x$ and $NH_3$ exiting the SCR. This sensor may, thus, measure $NO_x$ exiting the SCR, which may continue to decrease as DEF or other treatment fluid is increased and, as such, the conversion rate of $NO_x$ may continue to increase. However, at some point, the catalyst in the SCR will no longer be able to support the increasing treatment fluid, which will cause ammonia to pass through the SCR (e.g., ammonia slip). This ammonia slip may cause the perceived $NO_x$ amount exiting the SCR to increase because of the $NO_x$ sensor cross-sensitivity. In view of this, the curve in FIG. 5 may be similar to that of FIG. 4 at lower $NH_3$ to $NO_x$ ratios because little to no ammonia is slipping through the system and the $NO_x$ sensor is measuring mainly $NO_x$ (e.g., similar to the Horiba system in the lab). However, as ammonia ($NH_3$) begins to slip through the SCR and not be consumed in the reactions therein, the conversion percentage may taper off because, while the amount of actual $NO_x$ exiting the system is continues to decrease, the $NH_3$ slipping through will cause the reading to begin to increase. At some point (e.g., the peak of the curves in FIG. 5), the amount of ammonia slip overcomes further decreases in actual $NO_x$ exiting the SCR and, as such, the conversion percentage begins to drop (e.g, the $NO_x$ reduction amount appears less because of the ammonia slip). At that point, the SCR catalyst may be said to have reached its maximum useful conversion capacity 400A/B/C. In this manner, a conventional $NO_x$ sensor (e.g., that is cross-sensitive to $NO_x$ and $NH_3$) together with knowledge of the effect of ammonia slip on the conversion curve may be used to establish the maximum useful conversion capacity of the SCR catalyst at any point in time by adjusting the dosing of DEF into the SCR.

In view of the above, the increasing doses of the DEF in the SCR that are being used to perform the method may be increased until a maximum useful conversion capacity of the SCR catalyst is established. The following order of steps for establishing a maximum conversion capacity 302 may result:

Measure $NO_{xin}$ 302A

Dose SCR reductant fluid as exhaust flows into the SCR 302B     Measure $NO_{Xout}$ 302C     Calculate an $NO_x$ conversion rate 302D ($1-NO_{xout}/NO_{xin}$)

Figure 6:
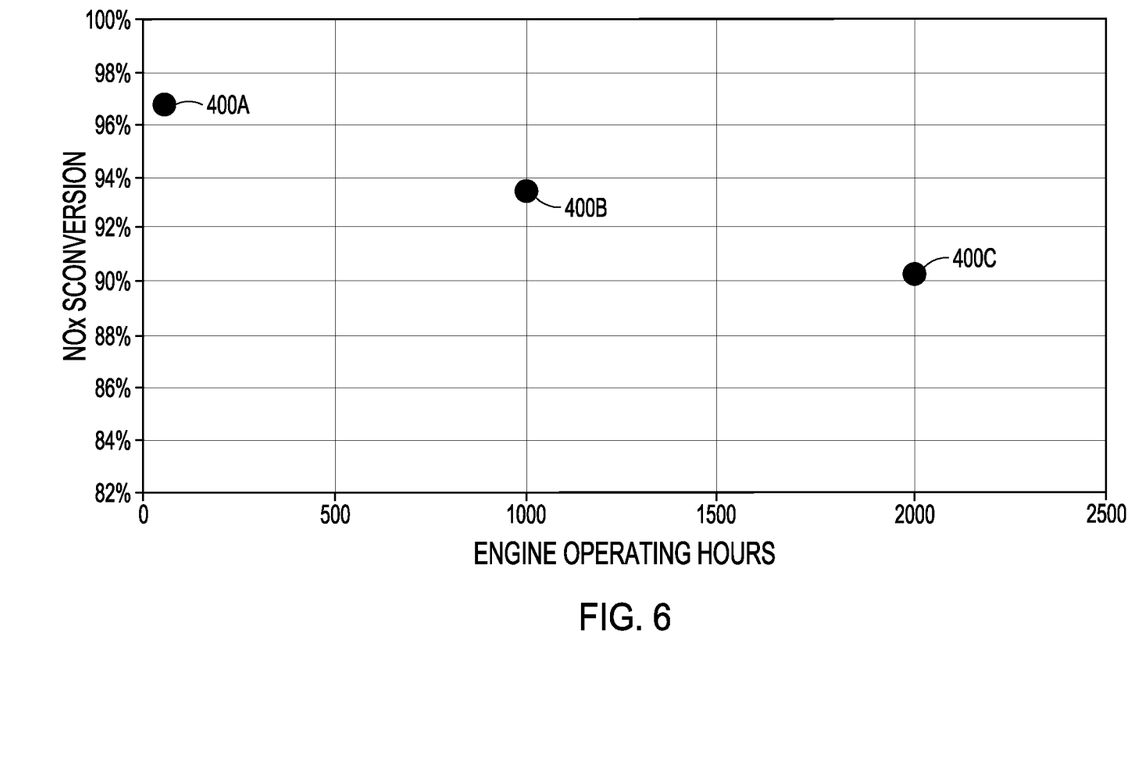
FIG. 6 is a graph showing the conversion capacity of an SCR, such as that of FIG. 2, based on particular engine operating hours, according to one or more examples.

Repeat steps 302A-302D with increasing doses until maximum conversion capacity of SCR catalyst is identified As mentioned above, and with reference to FIG. 6, where the maximum useful conversion capacity of the SCR catalyst is calculated at more than one point in time, a trend line or curvilinear trend line may be established that reflects the deterioration trend of the catalyst. This trend line or curvilinear trend line may be used to estimate the capacity of the SCR catalyst at different times 306 or to calculate or determine the operational time until end of life of the catalyst 308. That is, for example, as shown, where the maximum useful conversion capacity is established at 50 hours and again at 1000 hours, the anticipated conversion capacity at 2000 hours may be estimated based on the slope of the line and extrapolating the line out to 2000 hours which shows that the conversion capacity at 2000 hours may be approximately 90%. Moreover, if the design criteria of the system requires, for example 86% conversion to meet regulations, the number of hours at which the work machine will no longer be able to reach that level of conversion may be estimated based on an extrapolation of the trend line or curvilinear trend line established based on the several maximum useful conversion capacities established at various hours of operation. Once the number of total operating hours is established, the current or already spent operating hours may be deducted to determine the remaining number operating hours. That is, for example, FIG. 6 shows that the catalyst may drop to 86% conversion at approximately 3000 hours. If the work machine has currently been operating for 2000 hours, then the remaining useful life would be approximately 1000 hours. The trend line or curvilinear trend line may be established using one of several known ways of fitting a line to two or more points such as a least squares approach or other approach. Extrapolation may also be performed using one of several known approaches.

While the present method has been described as being useful for current systems that include $NO_x$ sensors upstream and downstream of the SCR, systems may also be augmented with a downstream $NH_3$ sensor. That is, rather than rely on a cross-sensitive $NO_x$ sensor, in one or more examples, an $NH_3$ sensor may be provided that would allow for generating the ammonia slip curves on an operating machine (e.g, curves similar to that shown in FIG. 4). This may allow for tracking the changes in the $NO_x$ conversion for a pre-defined $NH_3$ slip level. For various reasons, system designs may be tailored to limit the amount of ammonia slip to 10 ppm and having an $NH_3$ sensor may allow for generating a curve similar to that of FIG. 6 where $NO_x$ conversion over time is provided with a maximum ammonia slip of 10 ppm. In this situation, at step 302C, both $NO_{xout}$ and $NH_3$ would be measured. In addition, at step 302D, calculating the conversion rate may involve first adjusting the $NO_{xout}$ to backout the $NH_3$ to arrive at a conversion curve similar to that of FIG. 4. Then, a particular amount of ammonia slip may be selected and a corresponding conversion rate may be determined. Moreover, if ammonia slip was being limited to, for example, 10 ppm, the steps would be repeated until the ammonia slip reached 10 ppm and that would be the maximum useful conversion capacity of the SCR catalyst at that time. As before, multiple tests could be run at particular times to generate a trend line similar to that of FIG. 6, but based on a maximum ammonia slip of 10 ppm rather than the point at which further decreases in $NO_x$ are outweighed by ammonia slip.

Still further, another practical use of the above system would be to generate FIG. 6 by any of the approaches described herein. However, instead of or in addition to plotting the maximum $NO_x$ conversion, we could also plot the $NH_3$ to $NO_x$ ratio at the maximum $NO_x$ conversion. For example, the vertical scale on FIG. 6 may be the ratio of $NH_3$ to $NO_x$ and point 400A may be at 1.4, 400B may be 1.25, and 400C may be at 1.2, for example. That is, at some point, if the catalyst cannot support a $NH_3$ to $NO_x$ ratio higher than a particular level, it may be said to be spent, so to speak.

The above detailed description is intended to be illustrative, and not restrictive. The scope of the disclosure should, therefore, be determined with references to the appended claims, along with the full scope of equivalents to which such claims are entitled.

What is claimed is:

1. An aftertreatment system for an engine on a work machine, comprising:
    a selective catalytic reduction (SCR) system configured for arrangement downstream of the engine and having a dosing system for dosing the SCR system with treatment fluid;
    a $NO_{xin}$ sensor arranged at or near an inlet of the SCR system;
    a $NO_{xout}$ sensor arranged at or near an outlet of the SCR system; and
    an SCR catalyst monitoring module configured to:
        periodically establish a maximum $NO_x$ conversion capacity of an SCR catalyst in the SCR system by providing increasing doses of treatment fluid to the SCR system until a threshold is reached; and
        establish an SCR deterioration trend based on 2 or more results of the periodically established maximum $NO_x$ conversion capacities and a time interval between the results.

2. The aftertreatment system of claim 1, wherein the threshold is reached when increases in $NO_x$ conversion by the SCR system are outweighed by ammonia slip.

3. The aftertreatment system of claim 1, wherein the SCR catalyst monitoring module is also configured to use the trend to calculate an estimated maximum $NO_x$ conversion capacity at a future time based on a selected amount of additional operating time.

4. The aftertreatment system of claim 1, wherein the SCR catalyst monitoring module is also configured to use the trend to calculate a an amount of additional operating time until a selected minimum $NO_x$ conversion capacity is reached thereby establishing a useful remaining life of the SCR catalyst.

5. The aftertreatment system of claim 2, wherein, for each dose of the increasing doses of treatment fluid into the SCR system, the SCR catalyst monitoring module is configured to measure $NO_{xin}$ using the $NO_{xin}$ sensor, measure a combined $NO_{xout}$ and $NH_3$ using the $NO_{xout}$ sensor, and calculate an $NO_x$ conversion for each respective dose.

6. The aftertreatment system of claim 5, wherein the SCR catalyst monitoring module is configured to calculate the $NO_x$ conversion for each respective dose by dividing $NO_{xout}$ by $NO_{xin}$ to provide a result and subtracting the result from the number one.

7. The aftertreatment system of claim 5, wherein the SCR catalyst monitoring module is configured to calculate the $NO_x$ conversion for each respective dose by subtracting $NO_{xout}$ from $NO_{xin}$ to determine an $NO_x$ reduction and dividing the $NO_x$ reduction by $NO_{xin}$.

8. The aftertreatment system of claim 7, wherein the ammonia slip is determined by on-board $NH_3$ sensors.

9. The aftertreatment system of claim 1, wherein the threshold is a selected amount of ammonia slip.

10. A method of aftertreatment of exhaust from an engine, comprising:
    periodically establishing a maximum $NO_x$ conversion capacity of an SCR catalyst within a selective catalytic reduction (SCR) system on an operating work machine by providing increasing doses of treatment fluid to the SCR system until a threshold is reached; and
    establishing an SCR deterioration trend based on 2 or more results of the periodically established maximum $NO_x$ conversion capacities and a time interval between the results; and
    at least one of:
    using the trend to calculate an estimated maximum conversion capacity at a future time based on a selected amount of additional operating time; and
    using the trend to calculate an amount of additional operating time until a selected minimum $NO_x$ conversion capacity is reached thereby establishing a remaining useful life of the SCR catalyst.

11. The method of claim 10, wherein the threshold is reached when increases in $NO_x$ conversion by the SCR system are outweighed by ammonia slip.

12. The method of claim 11, further comprising, for each dose of the increasing doses of treatment fluid to the SCR system, measuring $NO_{xin}$ using an $NO_{xin}$ sensor arranged at or near an inlet of the SCR system, measuring a combined $NO_{xout}$ and $NH_3$ using an $NO_{xout}$ sensor arranged at or near an outlet of the SCR system, and calculating an $NO_x$ conversion for each respective dose.

13. The method of claim 12, wherein calculating the $NO_x$ conversion for each respective dose comprises dividing $NO_{xout}$ by $NO_{xin}$ to provide a result and subtracting the result from the number one.

14. The method of claim 12, wherein calculating the $NO_x$ conversion for each respective dose comprises subtracting $NO_{xout}$ from $NO_{xin}$ to determine an $NO_x$ reduction and dividing the $NO_x$ reduction by $NO_{xin}$.

15. The method of claim 14, wherein the ammonia slip is determined by on-board $NH_3$ sensors.

16. The method of claim 10, further comprising scheduling maintenance on the SCR system based on the remaining useful life of the SCR catalyst.

17. The method of claim 10, wherein establishing a deterioration trend comprises fitting a line to the 2 or more results.

18. The method of claim 17, wherein fitting a line comprises using a least squares approach.

19. The method of claim 18, wherein using the trend to calculate an estimated maximum conversion capacity at a future time or using the trend to calculate the amount of additional operating time until a selected minimum $NO_x$ conversion capacity is reached comprises extrapolating the trend to the selected amount of additional operating time or to the selected minimum $NO_x$ conversion capacity, respectively.

20. The method of claim 10, wherein the threshold is a selected amount of ammonia slip.

* * * * *